UNITED STATES PATENT OFFICE.

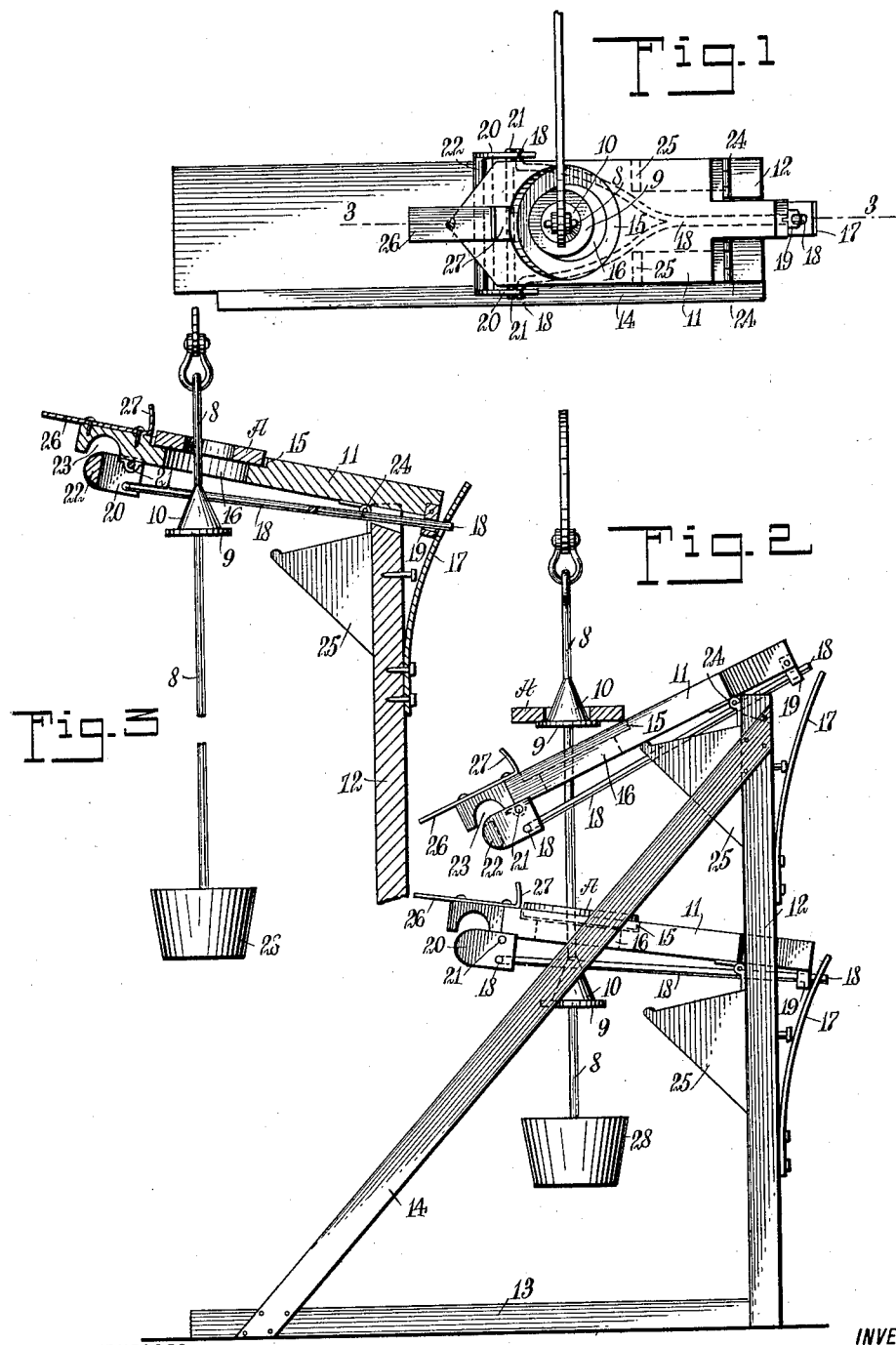

ALBERT FRANCIS CONANT, OF LITTLETON, MASSACHUSETTS.

APPARATUS FOR HANDLING SCALE WEIGHING DEVICES.

1,012,522.  Specification of Letters Patent.  Patented Dec. 19, 1911.

Application filed February 2, 1911. Serial No. 606,098.

*To all whom it may concern:*

Be it known that I, ALBERT F. CONANT, a citizen of the United States, and a resident of Littleton, in the county of Middlesex and State of Massachusetts, have invented a new and Improved Apparatus for Handling Scale Weighing Devices, of which the following is a full, clear, and exact description.

Among the principal objects which the present invention has in view are: to provide means for placing and removing weighing devices from scale beams during the operation of weighing; to provide means for placing weighing devices of various weights upon the scale beam; and to provide an auxiliary device disposed to receive a plurality of weighing devices of different magnitudes.

One embodiment of the present invention is disclosed in the structure illustrated in the accompanying drawings, in which like characters of reference denote corresponding parts in all the views, and in which—

Figure 1 is a top view of a fragment of a steelyard of a weighing scale, shown in conjunction with the apparatus for handling the weighing devices constructed and arranged in accordance with the present invention; Fig. 2 is a side view of an apparatus for handling scale weighing devices of weighing scales, shown in conjunction with the steelyard of the weighing scales, and showing the parts in position after having delivered the weighing devices upon the steelyard; and Fig. 3 is a vertical section taken on the line 3—3 in Fig. 1, showing the apparatus for handling the weighing devices in position to support the said weighing devices.

The present invention has in view the production of an apparatus constructed and arranged to hold the weighing devices used in conjunction with counter and similar scales when the said weighing devices are placed in position upon the steelyard, it being the intention also to arrange the said apparatus so that by the manipulation thereof a weighing device is deposited in operative relation upon the steelyard. In conjunction with such an apparatus, and to coöperate therewith, the steelyard is provided with a weight rod constructed and arranged as shown in the drawings. Counter scales are provided with weighing devices, which, when applied at the end of the steelyard, serve to draw down the same to lift certain ascertained weights upon the scale platform or tray. These weights are for a certain unit amount and multiples thereof. Thus, weighing devices for 1 pound, 2 pounds, 4 pounds and 7 pounds could be multiplied to weigh to 15 pounds, provided, of course, that the steelyard be subdivided and have a sliding weighing device equal to 1 pound when moved to the outer end of the steelyard. In the accompanying drawings there are shown two weighing devices and apparatus for manipulating the same.

In the present invention the steelyard is provided with and has suspended from the end thereof a weight rod 8. Upon the weight rod 8 is disposed a series of platforms 9, 9. Each platform is fixedly secured to the rod 8, and has superposed thereon a cone 10. The cone 10 is provided to guide and center the weighing devices A when the same are deposited upon the platforms 9. The weighing devices A are provided with suitable central perforations. As many platforms 9 are used on the rod 8 as the scale is calculated for. The number of platforms used is influenced by the number of unit weighing devices employed. Each weighing device is handled by a supporting arm 11. The arm 11 is pivotally connected to an upright 12, which is secured in upright position by braces 13 and 14. Each of the arms 11 is pivoted upon the upright 12, as stated, and is provided with a pocket 15, equaling in diameter the diameter of the weighing device for which it is provided. The arms 11 are cut away beneath the pockets to form circular passages 16 to permit the rock of the arms 11 over a suitable arc without impinging upon the rod 8, and also to pass freely the platforms 9. The arms 11 are supported in the position shown in Figs. 3 and 2 of the drawings under certain conditions. When in the position shown in Fig. 3, the weighing device A is lifted from the pocket 15 and suspended in the said arm 11. It is to hold the arm 11 in the position where 11 supports the device A that there is provided a spring latch 17, provided to receive the end of a latch rod 18. The latch rod 18 is supported in a guide 19 formed at the rear end of the arm 11, and upon a swinging handle member 20. The member 20 is pivoted at 21 at the forward end of the arm 11, and is provided with a weight bar 22 arranged to be lifted into a recess 23 in the arm 11.

When the handle member 20 is manipulated to raise the cross bar 22 into the recess 23, the said handle swings by gravity on the pivot 21 and draws outward the rod 18, releasing the same from engagement with the latch 17. In this position the arm 11 is free to be depressed. In depressing the arm the same swings upon its pivot 24 and deposits the weighing device A upon the platform 9, the cone 10 connected with the said platform guiding the weighing device to center the same upon the said platform. In this depressed position, as shown in Fig. 2 of the drawings, the arms 11 are supported by brackets 25.

When the weighing operation is completed in which the weighing device A has been employed, the arm 11 is lifted, engaging for this purpose an extended handle 26. The weight of the cross bar 22 normally rocks the handle 20 to the position shown in Fig. 2 of the drawings, wherein the end of the rod 18 is extended. When now the arm 11 is raised, the pocket 15 is brought in line with and under the weighing device A to lift the same from the platform 9 to the position shown in Fig. 3 of the drawings. In thus lifting the arm 11, and to guide the device A, I have provided an upturned guide 27 extended from, and of the same material forming, the handle 26.

The rod 5 is provided at the lower end with a balancing weight 28. This balancing weight is of the usual type, being so constructed as to be varied by the inspector of scales to correct any variation in the scale found on inspection.

It is obvious that with an apparatus thus constructed and arranged, the time employed in placing the weighing device A in position is minimized. It is also obvious that when handling a device thus constructed and arranged the loss of the weighing device, which forms a source of annoyance in stores employing scales, is avoided. It is impossible to unintentionally remove the devices A, as the same are to all intents and purposes locked upon the rod 8.

Having thus described my invention, what I claim as new and desire to secure by Letters Patent, is:—

1. An apparatus for handling scale weighing devices, comprising a weight rod having formed thereon in fixed relation and at fixed stations a series of platforms, said platforms having superposed thereon conical guide members for centering the said weighing devices upon said platforms; a plurality of weighing devices of different unit weights, each having a central perforation and each being threaded upon the said weight rod, and said perforations being adapted to extend over the said conical guide members; a supporting frame disposed adjacent the said weight rod; a plurality of supporting arms guidably mounted on said supporting frame and having pockets in the extended end thereof adapted to hold the said weighing devices; and means for locking the said arms in position to support the said weighing devices free of said weight rod.

2. An apparatus for handling scale weighing devices comprising a weight rod having formed thereon in fixed relation and at fixed stations a series of platforms, said platforms having superposed thereon conical guide members for centering the said weighing devices upon said platforms; a plurality of weighing devices of different unit weights, each having a central perforation and each being adapted to extend over the said conical guide members; a supporting frame disposed adjacent the said weight rod; a plurality of supporting arms for said weighing devices pivotally mounted on said supporting frame and having formed in the outer end thereof pockets for said weighing devices, said pockets having perforations to infold without impingement the said weight rod; a spring latch for locking the said arms in position to support the said weighing devices free of said weight rod; and supporting members for supporting said arms below said weighing devices after the same have been deposited on said weight rod.

3. An apparatus for handling scale weighing devices, comprising a weight rod having formed thereon in fixed relation and at fixed stations a series of platforms, said platforms having superposed thereon conical guide members for centering the said weighing devices upon said platforms; a plurality of weighing devices of different unit weights, each having a central perforation and each being threaded upon the said weight rod; and said perforations being adapted to extend over the said conical guide members; a supporting frame disposed adjacent said weight rod; a plurality of supporting arms for said weighing devices pivotally mounted on said supporting frame and having formed in the outer end thereof pockets for said weighing devices, said pockets having perforations to infold without impingement the said weight rod; a spring latch for locking the said arms in position to support the said weighing devices free of said weight rod; supporting members for supporting said arms below said weighing devices after the same have been deposited on said weight rod; and a guide mounted on said arms for guiding the said weighing devices within said pockets when said arms are raised to lift the said weighing devices from engagement with said weight rod.

4. An apparatus for handling scale weighing devices, comprising a weight rod having formed thereon in fixed relation and at fixed stations a series of platforms, said platforms having superposed thereon conical guide members for centering the said weighing devices upon said platforms; a plurality of weighing devices of different unit weights, each having a central perforation and each being threaded upon the said weight rod, and said perforations being adapted to extend over the said conical guide members; a supporting frame disposed adjacent the said weight rod; a plurality of supporting arms for said weighing devices pivotally mounted on said supporting frame and having formed in the outer end thereof pockets for said weighing devices, said pockets having perforations to infold without impingement the said weight rod; a spring latch for locking the said arms in position to support the said weighing devices free of said weight rod; supporting members for supporting said arms below said weighing devices after the same have been deposited on said weight rod; a guide mounted on said arms for guiding the said weighing devices within said pockets when said arms are raised to lift the said weighing devices from engagement with said weight rod; and a latch rod mounted on said arms to lock the same in raised position.

In testimony whereof I have signed this specification in the presence of two subscribing witnesses.

ALBERT FRANCIS CONANT.

Witnesses:
 CHARLOTTE S. BLANCHARD,
 FANNIE A. SANDERSON.

Copies of this patent may be obtained for five cents each, by addressing the "Commissioner of Patents, Washington, D. C."